(12) United States Patent
Wei et al.

(10) Patent No.: US 11,797,544 B2
(45) Date of Patent: Oct. 24, 2023

(54) AUTOMATED SEARCH RECIPE GENERATION

(71) Applicant: INTUIT INC., Mountain View, CA (US)

(72) Inventors: Ling Feng Wei, San Diego, CA (US); Irene Ma, San Diego, CA (US); Pravin Bhutada, Mountain View, CA (US); Igor A. Podgorny, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 519 days.

(21) Appl. No.: 16/701,748

(22) Filed: Dec. 3, 2019

(65) Prior Publication Data

US 2020/0104305 A1 Apr. 2, 2020

Related U.S. Application Data

(63) Continuation of application No. 15/634,184, filed on Jun. 27, 2017, now Pat. No. 10,528,576.

(51) Int. Cl.
*G06F 16/00* (2019.01)
*G06F 16/2457* (2019.01)
*G06N 20/00* (2019.01)
*G06F 16/248* (2019.01)

(52) U.S. Cl.
CPC ...... *G06F 16/24578* (2019.01); *G06F 16/248* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2005/0125382 A1* | 6/2005 | Karnawat | G06F 16/9535 |
| 2008/0001481 A1 | 6/2008 | Mall | |
| 2008/0148150 A1* | 6/2008 | Mall | G06F 3/048 |
| | | | 715/707 |
| 2009/0164929 A1* | 6/2009 | Chen | G06F 16/9535 |
| | | | 707/999.005 |

(Continued)

OTHER PUBLICATIONS

Podgorny, Igor A., Goodyear, Todd, "Content Qualtiy and User Ranking in TurboTax AnswerXchange", Edited by Rospigliosi, Asher, Greener, Sue; "Proceedings of the European Conference on Social Media", University of Brighton UK, Jul. 10-11, 2014.

*Primary Examiner* — Thu Nguyet T Le
(74) *Attorney, Agent, or Firm* — Patterson + Sheridan, LLP (57) ABSTRACT

Techniques are disclosed for dynamically generating a data set representative of search results in response to a query and using the data set to accurately rank search results in response to a domain specific search query. Upon receiving the search query, features of the query and features of each search result are extracted. A relevance ranking may be assigned to each search result based on a comparison of the features of the query and each search result. The relevance ranking of each search result may be adjusted based on metrics related to user interactions. A data set may be created which includes the query, search results, extracted features, and metrics. The data set may be used to train a machine learning model to accurately determine a ranking of search results in response to a subsequent search query.

20 Claims, 5 Drawing Sheets

(56) References Cited

U.S. PATENT DOCUMENTS

| | | | |
|---|---|---|---|
| 2013/0066821 A1* | 3/2013 | Moore | G06Q 30/0261 |
| | | | 706/46 |
| 2013/0001598 A1 | 6/2013 | Liu et al. | |
| 2013/0159881 A1* | 6/2013 | Liu | G06Q 10/20 |
| | | | 715/753 |
| 2014/0001432 A1 | 5/2014 | Jain et al. | |
| 2014/0143222 A1* | 5/2014 | Jain | G06F 16/3325 |
| | | | 707/706 |
| 2015/0324361 A1* | 11/2015 | Glass | G06F 16/24578 |
| | | | 707/748 |
| 2017/0060960 A1* | 3/2017 | Kim | G06F 16/335 |

\* cited by examiner

AUTOMATED SEARCH RECIPE GENERATION

CROSS-REFERENCE TO RELATED APPLICATIONS

This Application is a continuation of and hereby claims priority under 35 U.S.C. § 120 to pending U.S. patent application Ser. No. 15/634,184, filed on Jun. 27, 2017, the contents of which are incorporated herein in their entirety.

BACKGROUND

Field

Embodiments presented herein generally relate to techniques for building training data to generate search results in response to a search query. More specifically, embodiments presented herein provide techniques for building a data set to determine a relevance rank of a plurality of search results for a domain specific search query.

Description of the Related Art

Search engines generally employ ranking algorithms to rank results of a search. The search results may include links to a support web page or a support document related to the search. A user may click on the links in the search results to find information related to the search. For example, the user may submit a search to find information related to a particular software product. In response to the search, a list of search results may be returned to the user. The user may click on one or more links in the search results to find information relevant to the search.

The user may expect the results to be ranked in order from most relevant to the search to least relevant to the search. However, the ranking of search results is typically optimized to generate more clicks on certain results. The more clicks on a particular search result may increase the ranking of that result. Thus, the particular result may be ranked higher in the list of search results when an additional search is submitted that is similar to the previous search. That is, even if the particular result is not relevant to the search, that result may have a higher relevance ranking and may be closer to the top of the list of search results, based on the number of clicks on that result.

For example, a large search engine may include advertisements near the top of the list of search results. The goal of the search engine may be to maximize the number of clicks on those advertisements to generate revenue. Thus, accuracy of a typical ranking algorithm is not actually based on the relevance of a search result to the query. Rather, accuracy of a ranking algorithm is based on generating a large number of clicks on a given search result (i.e., an advertisement) returned in response to a search query. Thus, the ranking of the given search result does not indicate the relevance of that result to the search.

SUMMARY

One embodiment presented herein includes a method for dynamically generating a data set representative of search results responsive to a search query. The method may generally include identifying features of the search query and features of a plurality of search results. The method may also include comparing the features of the search query and the features of the plurality of search results. The method may also include determining a relevance score for each search result in the plurality of search results based, at least in part, on the comparison and metrics related to prior interactions with the plurality of search results by a plurality of users. The method may also include generating an ordered list of the plurality of search results based on the relevance scores. The method may also include returning the ordered list in response to the search query.

Another embodiment presented herein includes a computer-readable storage medium storing instructions, which, when executed on a processor, perform an operation to generate a data set representative of search results responsive to a search query. The operation may generally include identifying features of the search query and features of a plurality of search results. The operation may also include comparing the features of the search query and the features of the plurality of search results. The operation may also include determining a relevance score for each search result in the plurality of search results based, at least in part, on the comparison and metrics related to prior interactions with the plurality of search results by a plurality of users. The operation may also include generating an ordered list of the plurality of search results based on the relevance scores. The operation may also include returning the ordered list in response to the search query.

Still another embodiment presented herein includes a system having a processor and a memory hosting an application, which, when executed on the processor performs an operation to generate a data set representative of search results responsive to a search query. The operation may generally include identifying features of the search query and features of a plurality of search results. The operation may also include comparing the features of the search query and the features of the plurality of search results. The operation may also include determining a relevance score for each search result in the plurality of search results based, at least in part, on the comparison and metrics related to prior interactions with the plurality of search results by a plurality of users. The operation may also include generating an ordered list of the plurality of search results based on the relevance scores. The operation may also include returning the ordered list in response to the search query.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Embodiments presented herein provide techniques for determining a relevance of search results to a search query.

More specifically, embodiments presented herein provide techniques for building a data set to rank search results based on a level of relevance to a domain specific search query.

In one embodiment, a query service receives a query from a client application. A user may submit the query seeking information related to the client application. The query service may obtain a large number of search results corresponding to support documents in a database. That is, a given search result may provide a link to one of the support documents in the database. The database may include documents, links to pages on an intranet or the internet, images, videos, other media files, or the like. A style (i.e., form) of the search query may be a question, a statement, or one or more words related to information sought by the query.

The query service may identify features of the query and features of each search result. The features of the query may include a length of the query, a style of the query, words or phrases in the query, etc. Features of the search results may include a length of a title of the corresponding support document, a length of the corresponding support document, words or phrases in the corresponding support document, etc.

The query service may compare the features of the query and features of the search results. Based on the comparison, the query service may determine a level of relevance of each search result to the search query. The level of relevance may be on a scale from zero to a maximum value. A relevance score of zero indicates that the search result is not relevant to the query while a relevance score of the maximum value indicates that the search result is relevant to the query. A result ranker may use the level of relevance of each search result to determine an order in which the search results are to be displayed to the user. For example, the search results may be ordered from most relevant to the query to least relevant to the query (e.g., from a relevance score of the maximum value to a relevance score of zero). The relevance score of a given search result may be an integer, floating point number, categorical variable, or the like.

In one embodiment, a portion of the search results are displayed to the user in response to the search query based on how many support documents are in the database and the level of relevance of each search result to the query. For example, subject matter of one or more support documents in the database may relate to pricing of the application. The query service may determine that the subject matter of the search query submitted by the user is related to content of the application and not pricing. Thus, the search results related to pricing of the application may not be included in the list of search results returned to the user.

Upon displaying the list of search results, the query service may obtain metrics related to user interactions with the search results. The metrics may include explicit feedback and implicit feedback from the user. Explicit feedback may include a vote provided by a user that indicates whether a particular search result is relevant to the query. Explicit feedback may also be provided by the user as text or in response to a product survey, etc.

The vote provided by the user may include an up-vote or down-vote. An up-vote may indicate that the particular search result is relevant to the search query submitted by the user. A down vote may indicate that the particular search result is not relevant to the query. The user may provide an up-vote when the particular search result or a support document corresponding to that result assist the user to resolve an issue with the application. Similarly, the user may provide a down-vote for the particular search result when that search result does not assist the user to resolve the issue.

The query service may obtain implicit feedback by monitoring actions of the user after the user selects a particular search result. The implicit feedback may indicate whether the particular search result is relevant to the search query. For example, a user may select a particular search result and subsequently submit an additional search query related to the same subject matter as the previous query. In such a case, the query service may determine that the selected search result is not relevant to the previous query.

Based on the explicit feedback and implicit feedback, the query service may reduce the relevance score of the selected result for the query submitted by the user. Thus, if another user submits a same or similar query related to the subject matter of the additional query, the search result selected by the first user may have a lower relevance ranking and appear lower in the list of search results displayed to the other user or, in some cases, not appear in the list of search results displayed to the other user.

Advantageously, embodiments disclosed herein provide techniques to automatically generate a domain specific data set to increase the accuracy of a relevance ranking of search results in response to a search query. A master data set as described herein may be used to train a machine learning model to determine a level of relevance of each search result to the query. The embodiments disclosed herein may increase the efficiency and usability of a self-support system related to an application, thus reducing a need for an assisted-support system (e.g., a support system in which a live support agent provides real-time support to a user).

Figure 1:
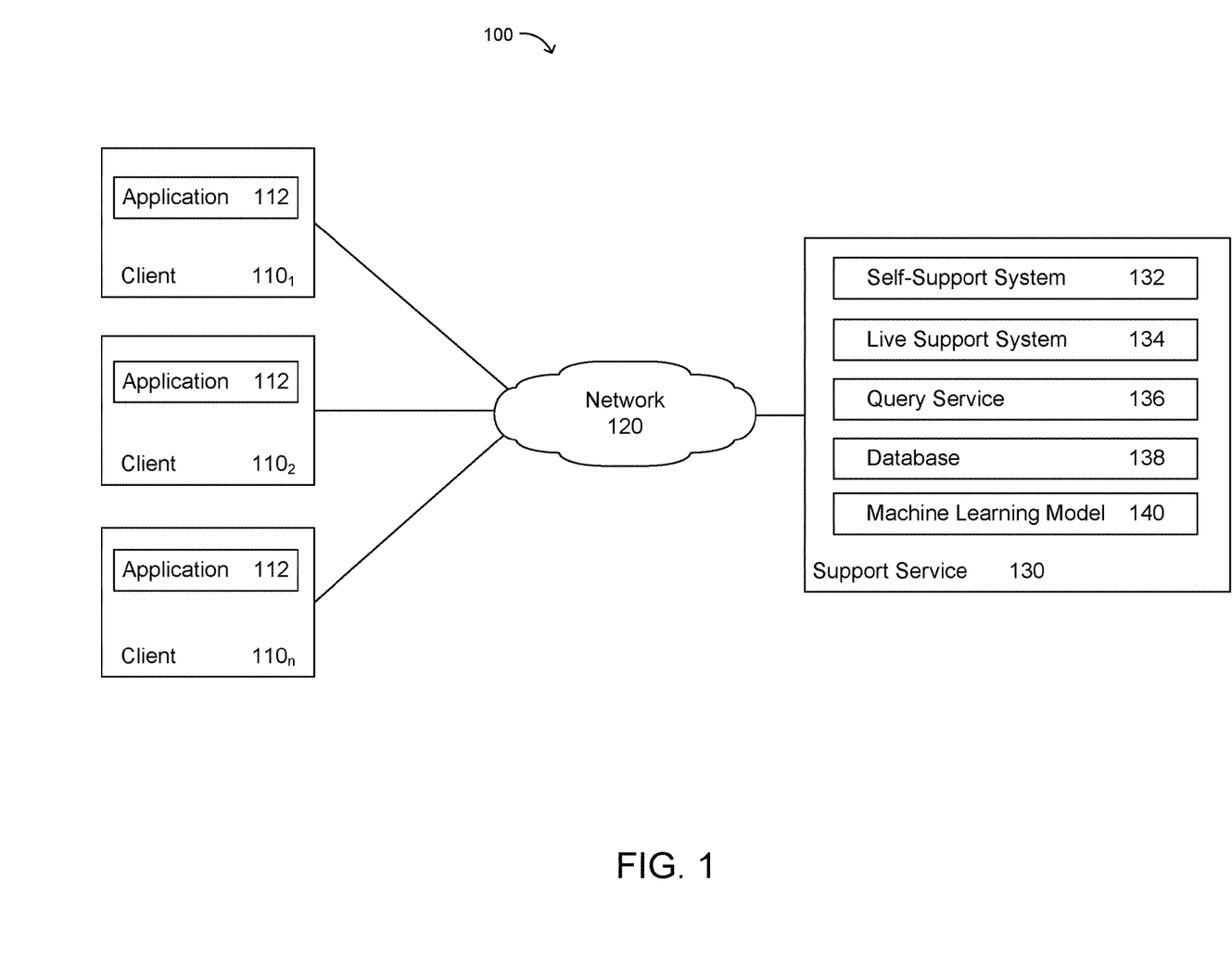
FIG. 1 illustrates an example computing environment, according to one embodiment.

FIG. 1 illustrates an example computing environment 100, according to one embodiment. As shown, the example computing environment 100 includes a plurality of clients 1101-$n$, a network 120, and a support service 130. The network 120 may be representative of a cellular network, local area network or similar network. Clients 110 may be representative of any computing platform such as a desktop computer, a tablet, a mobile device, or the like.

As shown, the support service 130 includes a self-support system 132, a live support system 134, a query service 136, a database 138, and a machine learning model 140. The live support system 134 provides a communication channel between the user of the application 112 and a support specialist for the application 112. For example, if a user encounters an issue while using the application 112, but cannot resolve the issue based on the support documents, the user may contact the support specialist via the live support system. Thus, the support specialist may assist the user in resolving the issue.

The database 138 may store a master data set generated by the query service 136, as discussed herein. The database 138 may also store support documents related to the application 112 and metrics related to user interactions with each of the support documents. The support documents may include documents that explain common issues that may arise while using the application 112 or provide troubleshooting information for issues that may be encountered in the application 112.

As shown, each client 110 may host one or more applications 112. The applications 112 may include a functionality to perform a search on behalf of a user of the client 110. For example, a user may submit a search query to the support service 130 using the application 112. Upon receiving a query, the query service 136 may extract features from the query. Features of the query may include a length of the query, words or phrases in the query, etc.

The query service 136 may also obtain a plurality of search results, each corresponding to a support document in the database 138. Each search result may provide a link to a corresponding support document in the database 138. For example, a given search result may provide a hyperlink that references a location of the corresponding support document in the database 138. The query service 136 may extract features from each support document in the database 138. Features of a support document may include a length of a title of the support document, a length of the support document, words or phrases in the support document, etc. The features extracted from each support document may be stored in the database 138 and associated with the corresponding document based on a mapping.

Each support document in the database 138 may be associated with a tag related to the subject matter of the document. The query service 136 may use the tags associated with the search results to determine an initial level of relevance of each search result to the search query. For example, the query service 136 may determine a subject matter of the query based on the features of the query. Upon determining that a tag of a given search result is related to the subject matter of the query, the query service 136 may assign an initial relevance score to that search result. If a tag of the given result is not related to the subject matter of the query, the query service 136 may not assign an initial relevance score to that result.

Once the features are extracted from the search query and support documents in database 138, the query service 136 may compare the features of the query to the features of each support document. Based on the comparisons, the query service 136 may assign a relevance score to each search result corresponding to a support document. The relevance score for a particular search result identifies a level of relevance of the corresponding support document to the query.

The order in which the search results are displayed to the user may be determined, at least in part, based on the relevance score assigned to each corresponding support document. For example, the support document with the highest relevance score for a given query may be the first result displayed to the user. The support document with the second highest relevance score may be the second result displayed to the user, and so on.

In one embodiment, the query service 136 may monitor user interactions with the search results returned to the user. The user interactions may include, for example, a click on a search result to open a corresponding support document. User interactions may also include invoking a live support session after opening the support document and submitting a second search query related to the subject matter of the first query. The query service 136 may also monitor a period of time the corresponding support document is open.

The query service 136 may generate metrics related to the user interactions. The metrics may indicate whether a particular search result is relevant to the search query and may be used to increase or decrease the relevance ranking of the particular search result. The metrics may include, for example, a click rate for a particular search result and explicit and implicit feedback from the user. The click rate for a particular search result may identify a number of clicks on that search result when returned in response to a search query.

Explicit feedback may include an up-vote or down-vote by the user for a particular search result. An up-vote indicates that the particular search result is relevant to the search query submitted by the user. A down-vote indicates that the particular search result is not relevant to the query. For example, if the user selects a particular search result which assists the user to resolve an issue with the application, the user can provide positive feedback for that search result by an up-vote. Similarly, if the particular search result did not assist the user to resolve the issue, the user can provide negative feedback for that result by a down-vote.

Some votes may be unreliable for determining a relevance score of the selected search result based on the vote. For example, a voting bias may affect the relevance score and ranking of the selected result. A voting bias may arise when a user is mistaken as to the relevance of the selected search result. The user may provide a down-vote for the selected result when the user was not able to resolve an issue in the application, even though the selected result is relevant to the search query. Thus, the down-vote provided by the user may incorrectly decrease the relevance score of that result.

Similarly, a voting bias may arise when a user provides a vote for the selected search result based on the satisfaction of the user regarding the overall application. For example, a user may submit a search query related to pricing of the application. If the user learns that a fee is required to continue using the application, the user may provide a down-vote for the selected result merely because a fee must be paid. In that case, the selected search result may be relevant to the pricing query, but the relevance score of that result may be decreased based on the down-vote. To prevent an unreliable vote from affecting the relevance score of a particular search result, an average vote for that result may be used to determine a relevance score of that result.

Implicit feedback may include actions taken by the user that do not provide explicit feedback. For example, implicit feedback may include a number of times the user contacts a support specialist after selecting a particular search result. This implicit feedback may indicate that the selected search result is not relevant to the query submitted by the user. Implicit feedback may indicate that a search result is relevant to the query if the user recommends the particular search result to a friend. Once the metrics related to user interactions are obtained, the query service 136 may add metrics related to the user interactions to the master data set.

A metric obtained from implicit feedback may include an assisted support deflection rate for each search result. The assisted support deflection rate for a given search result may be determined by identifying a number of live support sessions invoked after selecting that result from the list of search results. The more live support sessions invoked after selecting the result, the less relevant that result may be to the search query. Thus, a low number of live support sessions invoked after selecting a particular result indicates a high assisted support deflection rate, which may be used by query service 136 to increase a relevance score (and relevance ranking) of the particular result. Likewise, a high number of live support sessions invoked after selecting a particular result indicates a low assisted support deflection rate, which query service 136 may use to decrease a relevance score of the particular result.

The query service 136 may use metrics related to prior user interactions with the search results. For example, upon receiving a second search query submitted by a different user, the query service 136 may obtain the search results and the metrics obtained from user interactions with the search results returned in response to a first search query. The query service 136 may use the metrics to determine a relevance score for each search result returned in response to the second search query.

The query service 136 may generate the master data set to be provided to the machine learning model 140. The master data set may include the search query, the support documents, the features of the query, the features of the support documents, the metrics related to user interactions, and the relevance score corresponding to each support document. The master data set may be used to train the machine learning model 140 to more accurately determine the level of relevance of each search result based on user feedback.

Figure 2:
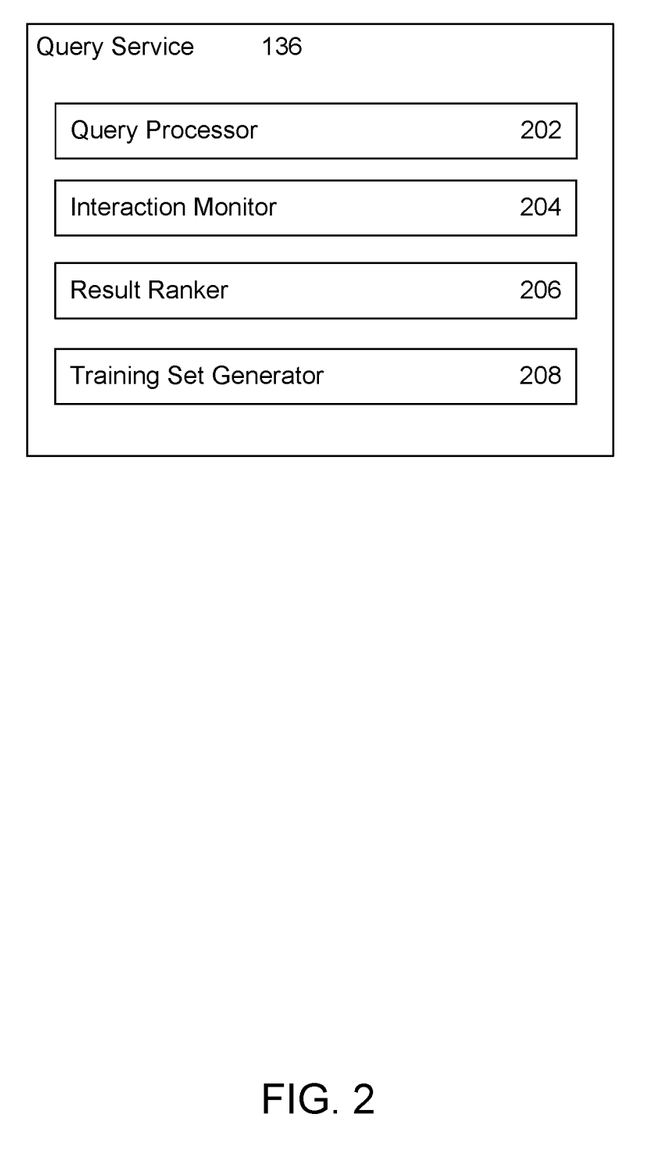
FIG. 2 illustrates an example query service, according to one embodiment.

FIG. 2 illustrates a query service 136, according to one embodiment. As shown, the query service 136 includes a query processor 202, an interaction monitor 204, a result ranker 206, and a training set generator 208. Upon receiving a query submitted by a user, the query processor 202 may extract features from the query. The features of the query may include a length of the query, words or phrases in the query, etc. The query processor 202 may also extract features of each support document corresponding to a search result. Features of a given support document may include a length of the title of the support document, a length of the support document, words or phrases contained in the support document, etc.

Once the features are extracted, the query processor 202 may compare the features of the query and the features of each support document to determine a relevance score for each support document. The relevance score for a support document may be adjusted based on user interactions after selecting a search result corresponding to that support document from a list of search results returned to the user.

The relevance score for a given support document may be determined based on a number of features of that document that match features of the query. For example, a support document with one or more words or phrases that match words or phrases in the query may be assigned a higher relevance score than a document that does not have any words or phrases matching those of the query.

User interactions with the search results may affect the relevance score of a corresponding support document. The user interactions may include selecting a particular search result to open a corresponding support document, invoking a live support session after opening the support document, submitting a second search query related to the subject matter of the first query, etc. To determine an effect of a user interaction on the relevance score of a support document, the interaction monitor 204 may obtain metrics associated with the user interactions. The metrics may include a click rate for a particular search result, explicit feedback from the user, and implicit feedback from the user.

The click rate for a particular search result may be determined by identifying a number of times a user selected that search result from the list of search results. The click rate may indicate a number of times the highest ranked search result (i.e., the top search result in the list of results) is selected when that result is not the most relevant to the query. For example, approximately 35% of first clicks by a user select the first search result while only 1% of clicks select the bottom result. However, the bottom result may have a relevance score that is the same as the first result. Thus, the number of clicks on each search result may be normalized to prevent the click rate for a given result from disproportionally affecting the relevance score of the search result.

A click bias may occur when a ranking algorithm uses a number of times a user selects a particular search result. That is, each time the particular result is selected, the ranking algorithm may increase the relevance ranking of that result. Thus, the number of clicks on the search result may affect the relevance ranking of that result. The number of clicks on all search results may be normalized to prevent a click bias from affecting the relevance ranking of the results.

To normalize the number of clicks on a given search result, the interaction monitor 204 may divide the number of clicks on each search result by a static value (e.g., five). The number of clicks on a given search result may also be normalized by assigning a click weight to each search result based on the relevance ranking of the result. For example, a large click weight may be assigned to a search result with a low relevance ranking (i.e., a low relevance score), and a small click weight may be assigned to a search result with a high ranking (i.e., a high relevance score). For each click on (i.e., selection of) a given search result, the click weight may increase or decrease the effect of that click on the relevance score of that search result. Normalizing the number of clicks on each search result provides a more reliable measure of relevance of the each search result.

Explicit feedback from the user may include an up-vote or a down-vote. An up-vote indicates that the search result was relevant to the query submitted by the user. A down-vote indicates that the search result was not relevant to the query. For example, when a user is satisfied with a search result (e.g., the search result assisted the user to resolve the issue experienced), the user can provide positive feedback regarding the search result by voting "up" for that search result. Similarly, if a user is not satisfied with a search result or the search result did not assist the user in resolving the issue, the user can provide negative feedback by voting "down" for that search result.

A voting bias may occur when a user provides a down vote for a given search result when that result is relevant to the search query. A voting bias may occur when a subject matter of the search query submitted by the user is related topic that is specific to the application. For example, the user may submit a search query related to pricing of services provided by the application. If the user selects a given search result, and learns that a fee must be paid to use the application, the user may be dissatisfied with the information learned from the result (i.e., a fee must be paid). In that case, the user may provide a down vote for the selected result even though that result is relevant to the query. To prevent a voting bias from affecting the relevance ranking of the result, an average vote may be determined.

The implicit feedback metric may indicate that a given support document is not relevant to the search query because the support document did not assist the user in resolving the issue without having to contact a live support specialist. For example, the implicit feedback may indicate a number of times the user contacted a live support specialist after submitting a query and selecting a particular search result.

The implicit feedback may also include a length of time the corresponding support document is open. The period of time the document is open may indicate that support document is not relevant to the search query if the period the document is open does not satisfy a threshold amount of time associated with the support document. Similarly, the period of time the document is open may indicate that the document is relevant to the search query if the period exceeds the threshold for that document.

An assisted support bias may arise, for example, when a user initiates an assisted support session, but the user is not satisfied with the assistance provided by support personnel. An assisted support bias may also arise if the user cannot determine how to contact live support for assistance. In either case, the user may provide a down vote for a particular search result. The user may believe that the down vote represents the dissatisfaction of the user towards the live support system or the overall application, rather than the ranking of the search results. To prevent the down vote from negatively affecting the rankings of the search results, the votes for each search result may be normalized as discussed above.

The result ranker 206 may use the features of the query, features of the support documents, and metrics related to user interactions to determine a relevance ranking for each search result in database 138. The result ranker 206 may use the relevance ranking for each search result to determine an order in which the search results are displayed to the user in response to a search query.

The training set generator 208 may obtain the search query, features of the query, features of each support document in the database, and the relevance ranking of each search result. The training set generator 208 may also obtain the metrics related to user interactions from the interaction monitor 204. This data is used to create a master data set to be used to train the machine learning model 140. The machine learning model 140 is trained to improve the accuracy of future determinations of relevance scores for each search result in response to a search query. The master data set and the machine learning model 140 may be updated in real-time (e.g., for each search query received) or in batches (e.g., periodically).

Figure 3:
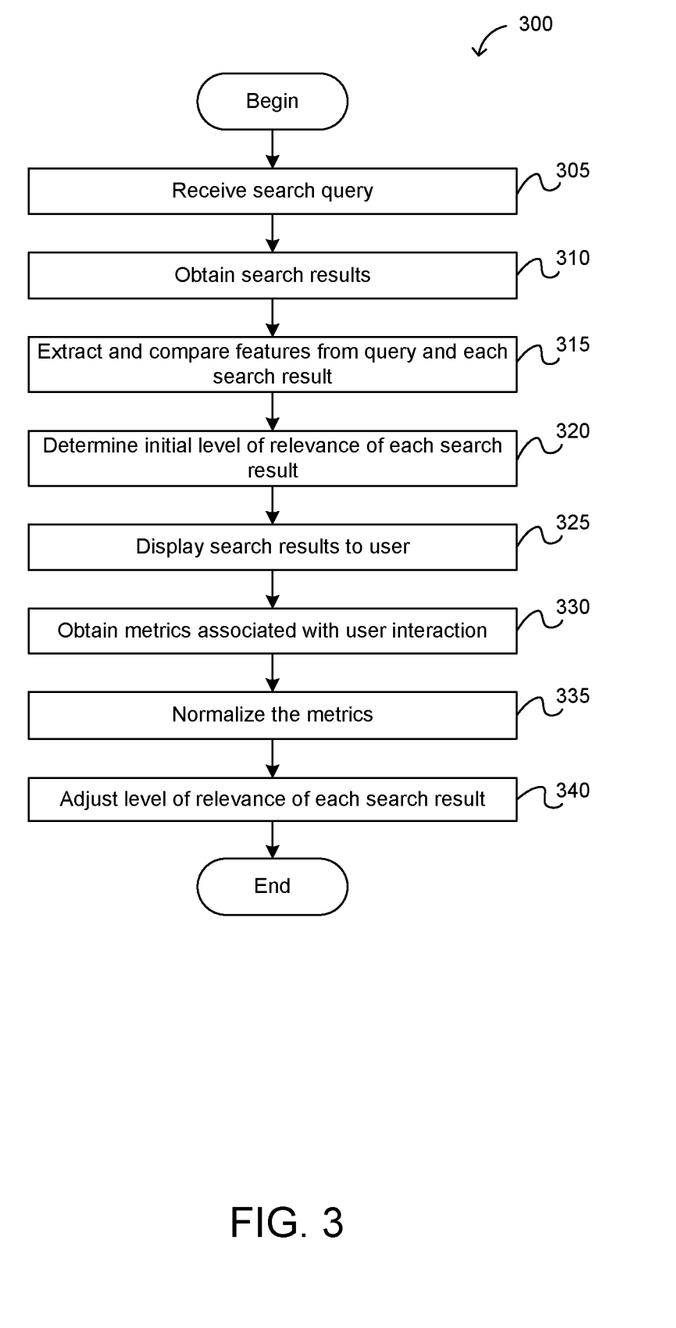
FIG. 3 illustrates a method for obtaining data to generate a master data set, according to one embodiment.

FIG. 3 illustrates a method 300 for obtaining data to generate a master data set, according to one embodiment. As shown, the method 300 begins at step 305 where a query service receives a domain specific search query submitted by a user. The query may be submitted by the user to obtain information related to an application executing on a client device of the user.

At step 310, the query service obtains search results to be returned to the user. Each search result may correspond to a support document in a database. For example, a given search result may provide a link to a support document in the database. The search result may also provide a link to a page on an intranet, a page on the Internet, or an image.

At step 315, the query service extracts features of the search query and features of each search result. Features of the query may include a length of the query, a style of the query, words or phrases in the query, etc. The style of the query may be a question, a statement, or one or more words related to the application. Features of a given search result may include a title of a support document corresponding to the search result, a length of that support document, words or phrases in the support document, etc. The query service compares the features of the search query to the features of the search results to determine an initial level of relevance of the each search result to the query at step 320.

At step 325, the search results are displayed to the user in order of relevance. The order of the search results may be based, at least in part, on the relevance of each search result to the query. For example, a search result most relevant to the search query may be at the top of the list and a search result least relevant to the query may be at the bottom of the list.

At step 330, the query service monitors and obtains metrics related to user interactions with the search results. The metrics may include a click rate for a particular search result, explicit feedback from users, or implicit feedback from users. The click rate for a particular search result may identify a number of times a user selected that result from the list of results.

A user may provide explicit feedback by voting whether the selected search result is relevant to the search query. For example, when a user selects a search result that is relevant to the search query or helpful in resolving an issue related to the search query, the user can provide an up-vote for that search result. On the other hand, if the selected search result is not relevant to the query or does not help the user resolve the issue related to the query, the user may provide a down-vote for that search result.

Upon receiving a search query and selection of a search result, the query service may obtain implicit feedback based on subsequent actions taken by the user. The query service may determine whether the selected result is relevant to the search query based on the implicit feedback. For example, the query service may determine that the selected search result is relevant to the query if the user does not submit a second query related to the subject matter of the original search query. The query service may also determine that the search result is relevant to the query if the user does not invoke a live-support session for assistance.

The query service may also determine that the selected search result is not relevant to the search query if the user subsequently invokes a live support session, selects a different search result returned for the query, or submits a second query related to the subject matter of the first query.

At step 335, the query service normalizes the metrics obtained in step 330. The metrics may be normalized to account for a click bias, a voting bias, an assisted support bias, etc. A click bias may occur when a ranking algorithm uses a number of times a given result is selected from the list of results. A user typically selects (e.g., clicks) a first search result in the list of results because the user assumes the first result is the most relevant result in the list of results. However, because the ranking algorithm depends on the number of times a given result is selected, the first result may not be the most relevant result. Thus, the relevance ranking of the first result may not correspond to the actual relevance of that result. The number of clicks on that result may be normalized to account for a large number of clicks on the top ranked search result and to prevent a click bias from affecting the relevance ranking of the result in response to a same or similar search query.

A voting bias may occur when a user provides a down vote for a search result even if the search result is relevant to a search query submitted by the user. This may occur when the user submits a search query related to pricing of services provided by the application. If the user selects a given search result and learns a fee is required to continue using the application, the user may provide a down vote for that search result. Even though the selected result is relevant to the pricing query, the user may be dissatisfied with the information learned from the result (i.e., a fee must be paid) and provide a down vote for the selected result. Thus, an average vote may be used to prevent a voting bias from affecting the relevance ranking of the result in response to a same or similar search query.

A voting bias may also occur when a user is mistaken as to the relevance of a search result to the query. For example, the user may mistakenly provide a down-vote for a search result when that result is relevant to the query submitted by the user. In that case, the mistake of the user in providing the down-vote negatively affects the relevance ranking for that search result. In other cases, a user may not be satisfied with the application overall. Thus, the level of satisfaction with the application may affect the user's satisfaction with the selected search result. For example, the user may select a search result and provide a down-vote for that result even if the result is relevant to the query. The down-vote may negatively affect the relevance ranking of the selected search result. The voting bias may be removed by utilizing an average vote for the selected search result.

Normalizing the metrics may account for a biased user, users mistaken as to the level of relevance of a selected search result (i.e., voting bias), users who do not see a relevant search result in the list of results, etc. To normalize a given metric, the query service may divide the metrics by a static value. For example, a number of clicks on each search result may be divided by an integer (e.g., five).

The metrics may also be normalized by assigning a weight to each search result. For example, a large weight value may be assigned to a search result with a low ranking and a small weight may be assigned to a search result with a high ranking. Normalizing the metrics provides a more reliable measure of relevance for each search result. At step 340, the query service adjusts the level of relevance of each search result to the search query based on the features and normalized metrics. The query service may also adjust the relevance score of each search result based on a weight assigned to each normalized metric and each matching feature between the search query and a given search result.

Figure 4:
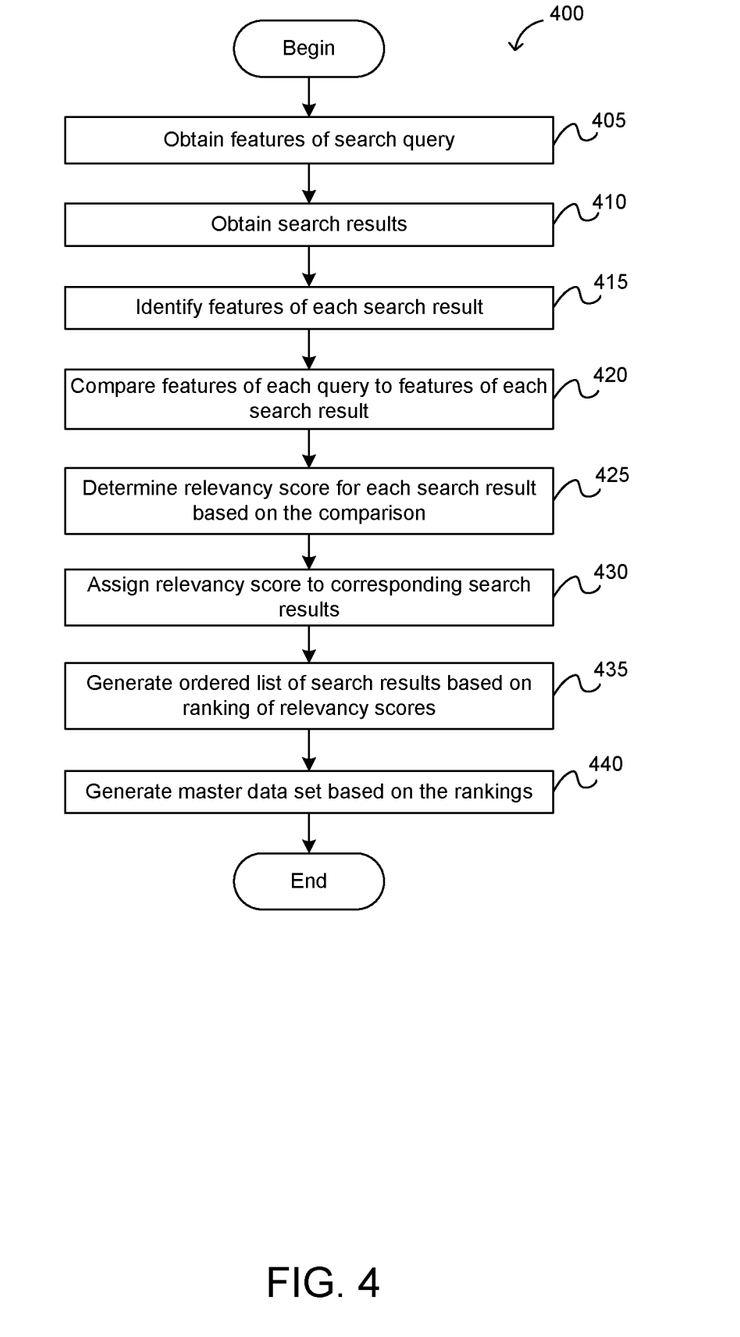
FIG. 4 illustrates a method for generating a master data set, according to one embodiment.

FIG. 4 illustrates a method 400 for generating a master data set, according to one embodiment. As shown, method 400 begins at step 405 where a query service obtains features of a search query submitted by the user. Features of the query may include a length of the query, a style of the query, particular words or phrases in the query, etc. The style of the query may include a question, a statement, or words related to an application executing on a client device of the user.

At step 410, the query service obtains the search results for the query submitted by the user. Each search result may correspond to a support document, a link to a page on an intranet or the Internet, an image, or the like. The support documents, images, etc., may be stored in a database related to the application executing on a client device of the user.

At step 415, the query service identifies features of each search result. The features of a given search result may include a length of a title of the corresponding support document, a length of the corresponding support document, words or phrases in the corresponding support document, etc. At step 420, the query service compares the features of the search query to the features of each search result.

At step 425, the query service determines a relevance score for each search result based on the comparison. The relevance score of a given search result may be an integer, floating point number, categorical variable, or the like. For example, the relevance score for each search result may start at zero. Based on the comparison, the relevance score of a given search result may be increased for each feature of the search result that is the same or similar to a feature of the query.

At step 430, the query service assigns the relevance score determined for a given search result to that result. The relevance score for each search result may be stored in the database related to the application. At step 435, the query service generates an ordered list of the search results based on the relevance rankings of each result. For example, the ordered list may contain each search result in order from most relevant to the query submitted by the user to least relevant to the query (e.g., highest to lowest relevance score). At step 440, the query service generates a master data set based on the relevance rankings. The master data set may include the query, features of the query, the search results, support documents in the database corresponding to the search results, features of the search results, and metrics related to user interactions with the search results.

Figure 5:
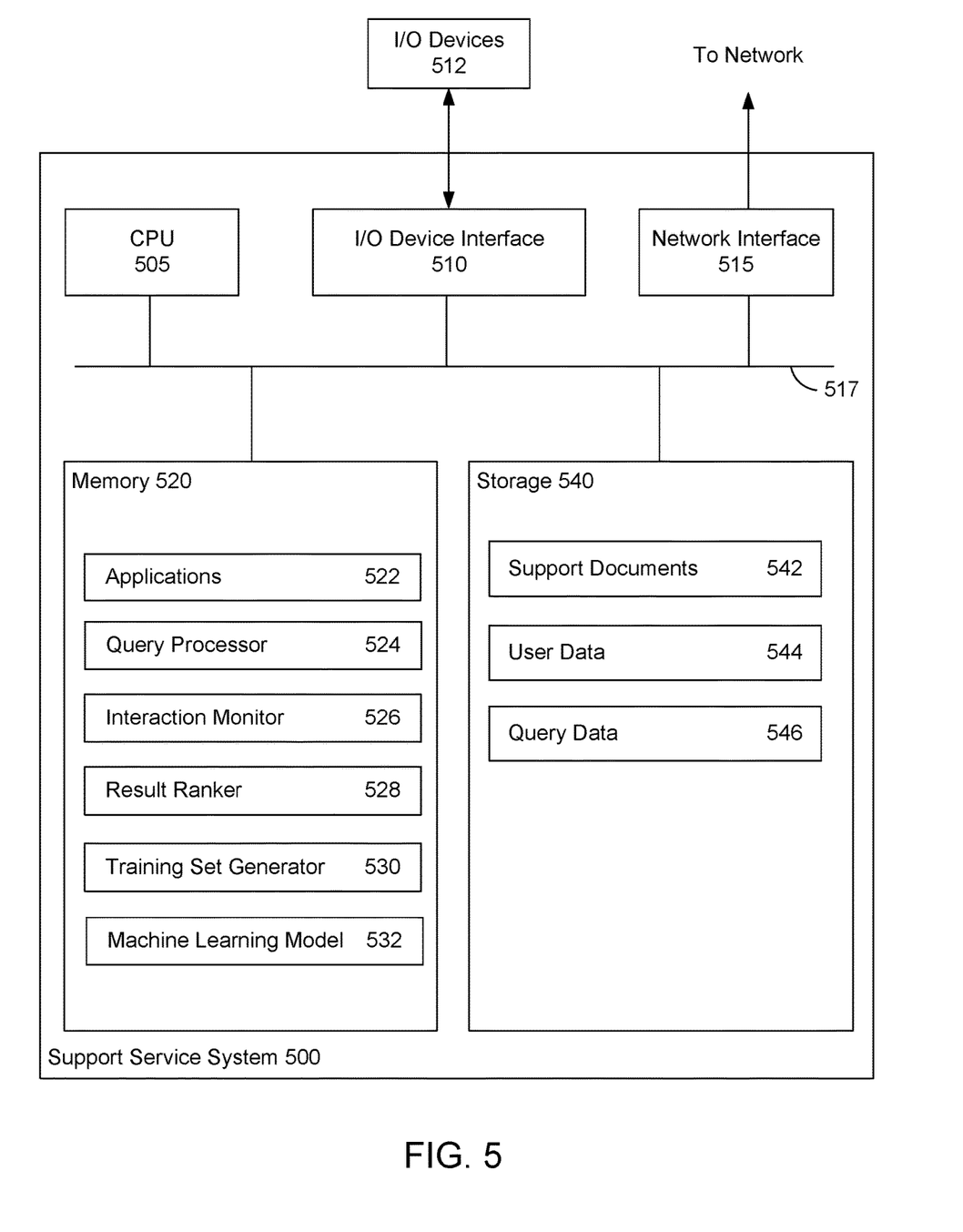
FIG. 5 illustrates a support service system configured to generate a master data set, according to one embodiment.

FIG. 5 illustrates an example support service system 500 configured to generate a master data set, according to one embodiment. As shown, the support service system 500 includes, without limitation, a central processing unit (CPU) 505, a network interface 515, a memory 520, and storage 540, each connected to a bus 517. The support service system 500 may also include an I/O device interface 510 connecting I/O devices 512 (e.g., keyboard, display, mouse devices, image capture devices, etc.) to the support service system 500. Further, the computing elements shown in support service system 500 may correspond to a physical support service system (e.g., a system in a data center) or may be a virtual computing instance executing within a computing cloud.

The CPU 505 retrieves and executes programming instructions stored in the memory 520 as well as stored in the storage 540. The bus 517 is used to transmit programming instructions and application data between the CPU 505, I/O device interface 510, storage 540, network interface 515, and memory 520. Note, CPU 505 is included to be representative of a single CPU, multiple CPUs, a single CPU having multiple processing cores, and the like, and the memory 520 is generally included to be representative of a random access memory. The storage 540 may be a disk drive or flash storage device. Although shown as a single unit, the storage 540 may be a combination of fixed and/or removable storage devices, such as fixed disc drives, removable memory cards, optical storage, network attached storage (NAS), or a storage area-network (SAN). As shown, storage 540 includes support documents 542, user data 544, and query data 546.

Illustratively, the memory 520 includes applications 522, a query processor 524, an interaction monitor 526, a result ranker 528, a training set generator 530, and a machine learning model 532. In certain aspects, these components may correspond to the components of the support service and query service described with reference to FIGS. 1 and 2.

For example, the applications 522 may include a search functionality to assist a user in resolving an issue related to one or more of the applications 522. The user may submit a search query using the applications 522. The query processor 524 may receive a search query submitted by the user and extract features from the query. The features of the query may include a length of the query, words or phrases in the query, and a style of the query (e.g., whether the query is a question or statement). The query processor 524 may obtain search results corresponding to the query from support documents 542. The query processor 524 may extract features from each of the obtained search results. The features of the a given result may include a length of the corresponding support document, a length of the title of the corresponding support document, words or phrases in the corresponding support document, etc.

The query processor 524 may compare the features of the search query to the features of search results. Based on the comparison, the query processor 524 determines whether a given search result is relevant to the search query. For example, the query processor 524 may determine that a phrase in the title of a given search result matches a phrase in the search query. In that case, the given search result is likely relevant to the search query. Thus, the query processor may assign a relevance score to the given search result indicating that search result is relevant to the search query.

Upon determining a relevance score for each search result, the query processor 524 may rank the search results in order from most relevant to least relevant. The ranked search results may be displayed to the user in response to the search query. The interaction monitor 526 may obtain metrics related to user interactions with the search results. The metrics may include a click rate on a particular search result, explicit feedback provided by the user, and implicit feedback from the user. The click rate of a particular search result may indicate a number of times a user selected that result after submitting a search query.

A user may provide explicit feedback by indicating whether the selected search result is relevant to the search query. Upon selecting a search result, the user may be presented with an option to vote whether the search result was relevant to the submitted search query. For example, a thumbs-up button and a thumbs-down button may be presented for the user to indicate whether the search result was relevant to the search query or not. The user may provide an up-vote, indicating the selected result is relevant to the query, by selecting the thumbs-up button. The user may provide a down-vote, indicating the selected result is not relevant to the query, by selecting the thumbs-down button.

Once the user selects a given search result, implicit feedback may be obtained based on subsequent actions taken by the user. The implicit feedback may indicate that the selected search result is not relevant to the query. For example, the interaction monitor 526 may identify a live-support session initiated by the user after selecting a particular search result and opening a corresponding support document. The live-support session initiated by the user indicates the search result selected by the user is not relevant to the search query because the selected result did not assist the user in resolving the issue that is the subject matter of the query. As another example, the interaction monitor 526 may also determine the user submitted a second query. If the subject matter of the second query is related to the subject matter of the first query, the second query may indicate that the search result returned for the first query and selected by the user is not relevant to the first query.

The interaction monitor 526 may determine a period of time from when the user selects a search result to open a corresponding support document until the user closes the support document. The period of time during which the support document is open may indicate whether that support document is relevant to the query. For example, the document being open for a short period of time (e.g., 5 seconds) may indicate that the support document is not relevant to the subject matter of the query. However, the short period of time the support document is open may also indicate the user quickly found the information sought by the search query. Thus, the metrics related to subsequent actions of the user may be monitored to more accurately determine the level of relevance of the selected search result.

Subsequent actions of the user that may indicate the selected search result is not relevant to the query, after closing a support document related to the selected search result, may include clicking on one or more additional search results displayed to the user, initiating a live support session, providing negative feedback (e.g., a down-vote) related to the selected search result, etc. The fact that the user does not perform one of these subsequent actions after closing a support document may indicate that the corresponding search result is relevant to the query.

The result ranker 528 determines a relevance ranking of each search result based on the features of the search query, the features of each search result, the interaction metrics, etc. The result ranker 528 may use the relevance rankings to determine an order in which the search results are returned to the user in response to a search query.

The training set generator 530 may obtain the search query, features of the query, and features of each search result from the query processor 524. The training set generator 530 may also obtain the metrics related to user interactions with the search results from the interaction monitor 526. The training set generator 530 may use this data to generate a master data set. The training set generator 530 provides the master data set to the result ranker 528. The master data set may be used to train the machine learning model to more accurately determine a relevance of each search result to a query submitted by a user of the application 522.

User data 544 may include information to identify each user of the applications 522 and one or more search queries submitted by each user. Query data 546 may include all search queries submitted by each user, features of each query, features of the search results for each query, and metrics related to interactions of each user with the search results.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for dynamically generating a data set representative of search results responsive to a search query, the method comprising:
    identifying features of the search query and features of a plurality of search results;
    comparing the features of the search query and the features of the plurality of search results;
    determining a relevance score for each search result in the plurality of search results based, at least in part, on the comparing and one or more metrics related to prior interactions with the plurality of search results by a plurality of users, wherein:
        the one or more metrics related to the prior interactions comprise, for each respective search result of the plurality of search results, implicit feedback based on one or more actions performed by a respective user of the plurality of users after the respective user selected the respective search result, wherein the one or more actions comprise one or more of:
            a number of times the user contacts a support specialist after selecting a particular search result; or
            initiating assisted support; and
        the relevance score for each given search result in the plurality of search results is determined based on assigning a weight to each prior selection of the given search result that is indicated in the prior interactions, wherein the weight is inversely related to a corresponding relevance score of the given search result;
    generating an ordered list of the plurality of search results based on the relevance score for each search result; and
    returning the ordered list in response to the search query.

2. The computer-implemented method of claim 1, wherein determining the relevance score for each search result comprises:
    determining an initial relevance score for each search result in the plurality of search results based on the comparison;
    assigning a weight to each of the features of the search query, the features of the search results, and the one or more metrics to generate weighted features; and
    adjusting the initial relevance score for each search result based in the ordered list based on the weighted features and metrics.

3. The computer-implemented method of claim 1, further comprising:
    generating a data set including the plurality of search results, the relevance score for each search result, and the metrics related to the prior interactions with the plurality of search results; and
    training a machine learning model with the data set.

4. The computer-implemented method of claim 1, wherein the metrics related to the prior interactions further comprise at least one of:
    a click rate; or
    an average vote.

5. The computer-implemented method of claim 4, wherein the click rate indicates a number of times each search result is selected from the ordered list of the plurality of search results and is normalized by dividing the number of times each result is selected by a static value.

6. The computer-implemented method of claim 4, wherein the average vote indicates a level of relevance of each search result provided by a user.

7. The computer-implemented method of claim 1, wherein the metrics related to the prior interactions further comprise, for each respective search result of the plurality of search results, implicit feedback based on a length of time that a support document indicated by the respective search result was open after a respective user of the plurality of users selected the respective search result.

8. A system comprising one or more processors and a non-transitory computer-readable medium comprising instructions that, when executed by the one or more processors, cause the system to perform a method for dynamically generating a data set representative of search results responsive to a search query, the method comprising:
    identifying features of the search query and features of a plurality of search results;
    comparing the features of the search query and the features of the plurality of search results;
    determining a relevance score for each search result in the plurality of search results based, at least in part, on the comparing and one or more metrics related to prior interactions with the plurality of search results by a plurality of users, wherein:
        the one or more metrics related to the prior interactions comprise, for each respective search result of the plurality of search results, implicit feedback based on one or more actions performed by a respective user of the plurality of users after the respective user selected the respective search result, wherein the one or more actions comprise one or more of:
            a number of times the user contacts a support specialist after selecting a particular search result; or
            initiating assisted support; and
        the relevance score for each given search result in the plurality of search results is determined based on assigning a weight to each prior selection of the given search result that is indicated in the prior interactions, wherein the weight is inversely related to a corresponding relevance score of the given search result;

generating an ordered list of the plurality of search results based on the relevance score for each search result; and returning the ordered list in response to the search query.

9. The system of claim 8, wherein determining the relevance score for each search result comprises:

determining an initial relevance score for each search result in the plurality of search results based on the comparison;

assigning a weight to each of the features of the search query, the features of the search results, and the one or more metrics to generate weighted features; and adjusting the initial relevance score for each search result based in the ordered list based on the weighted features and metrics.

10. The system of claim 8, wherein the method further comprises:

generating a data set including the plurality of search results, the relevance score for each search result, and the metrics related to the prior interactions with the plurality of search results; and training a machine learning model with the data set.

11. The system of claim 8, wherein the metrics related to the prior interactions further comprise at least one of:

a click rate; or an average vote.

12. The system of claim 11, wherein the click rate indicates a number of times each search result is selected from the ordered list of the plurality of search results and is normalized by dividing the number of times each result is selected by a static value.

13. The system of claim 11, wherein the average vote indicates a level of relevance of each search result provided by a user.

14. The system of claim 8 wherein the metrics related to the prior interactions further comprise, for each respective search result of the plurality of search results, implicit feedback based on a length of time that a support document indicated by the respective search result was open after a respective user of the plurality of users selected the respective search result.

15. A non-transitory computer-readable medium comprising instructions that, when executed by one or more processors of a computing system, cause the computing system to perform a method for dynamically generating a data set representative of search results responsive to a search query, the method comprising:

identifying features of the search query and features of a plurality of search results;

comparing the features of the search query and the features of the plurality of search results;

determining a relevance score for each search result in the plurality of search results based, at least in part, on the comparing and one or more metrics related to prior interactions with the plurality of search results by a plurality of users, wherein:

the one or more metrics related to the prior interactions comprise, for each respective search result of the plurality of search results, implicit feedback based on one or more actions performed by a respective user of the plurality of users after the respective user selected the respective search result, wherein the one or more actions comprise one or more of:

a number of times the user contacts a support specialist after selecting a particular search result;

or initiating assisted support; and the relevance score for each given search result in the plurality of search results is determined based on assigning a weight to each prior selection of the given search result that is indicated in the prior interactions, wherein the weight is inversely related to a corresponding relevance score of the given search result;

generating an ordered list of the plurality of search results based on the relevance score for each search result; and returning the ordered list in response to the search query.

16. The non-transitory computer-readable medium of claim 15, wherein determining the relevance score for each search result comprises:

determining an initial relevance score for each search result in the plurality of search results based on the comparison;

assigning a weight to each of the features of the search query, the features of the search results, and the one or more metrics to generate weighted features; and adjusting the initial relevance score for each search result based in the ordered list based on the weighted features and metrics.

17. The non-transitory computer-readable medium of claim 15, wherein the method further comprises:

generating a data set including the plurality of search results, the relevance score for each search result, and the metrics related to the prior interactions with the plurality of search results; and training a machine learning model with the data set.

18. The non-transitory computer-readable medium of claim 15, wherein the metrics related to the prior interactions further comprise at least one of:

a click rate; or an average vote.

19. The non-transitory computer-readable medium of claim 18, wherein the click rate indicates a number of times each search result is selected from the ordered list of the plurality of search results and is normalized by dividing the number of times each result is selected by a static value.

20. The non-transitory computer-readable medium of claim 18, wherein the average vote indicates a level of relevance of each search result provided by a user.

* * * * *